(12) United States Patent
Maunthrooa et al.

(10) Patent No.: US 12,028,278 B2
(45) Date of Patent: Jul. 2, 2024

(54) METHOD OF REDUCING LATENCY IN COMMUNICATION OF DATA PACKETS

(71) Applicant: CYBERSTORM PTE. LTD., Singapore (SG)

(72) Inventors: Nishant Maunthrooa, Singapore (SG); Loganaden Velvindron, Singapore (SG)

(73) Assignee: CYBERSTORM PTE. LTD., Singapore (SG)

( * ) Notice: Subject to any disclaimer, the term of this patent is extended or adjusted under 35 U.S.C. 154(b) by 0 days.

(21) Appl. No.: 17/796,514

(22) PCT Filed: Jan. 31, 2021

(86) PCT No.: PCT/SG2021/050045
§ 371 (c)(1),
(2) Date: Jul. 29, 2022

(87) PCT Pub. No.: WO2021/154158
PCT Pub. Date: Aug. 5, 2021

(65) Prior Publication Data
US 2023/0353510 A1 Nov. 2, 2023

(30) Foreign Application Priority Data
Jan. 31, 2020 (SG) ............................ 10202000926P (51) Int. Cl.
*H04L 49/90* (2022.01)
*H04L 41/082* (2022.01)
*H04L 49/901* (2022.01)

(52) U.S. Cl.
CPC ........ *H04L 49/9036* (2013.01); *H04L 41/082* (2013.01); *H04L 49/901* (2013.01)

(58) Field of Classification Search
CPC ............ H04L 41/08–0897; H04L 49/90–9094
See application file for complete search history.

(56) References Cited

U.S. PATENT DOCUMENTS

| 5,541,912 A | 7/1996 | Choudhury et al. |
| 6,556,578 B1 * | 4/2003 | Silberschatz ........... H04L 47/50 370/234 |

(Continued)

FOREIGN PATENT DOCUMENTS

| EP | 2187580 A1 * | 5/2010 | ............. H04L 47/29 |
| WO | 2016183155 A | 11/2016 | |
| WO | WO-2016183155 A1 * | 11/2016 | ......... H04L 12/1881 |

OTHER PUBLICATIONS

International Search Report and Written Opinion of International Searching Authority dated May 4, 2021 for International Application No. PCT/SG2021/050045.

*Primary Examiner* — Alina A Boutah
(74) *Attorney, Agent, or Firm* — JCIP; Joseph G. Chu; Jeremy I. Maynard (57) ABSTRACT

A method of reducing latency in communication of data packets comprising the steps of: receiving a data packet from a first device; determining whether the addition of the data packet results in the current number of data packets stored in all data queues exceeds a global threshold limit, where if the addition of the data packet results in the number of data packets stored not exceeding the global threshold limit then (i) allocate the data packet to a queueing group based on a predetermined factor; (ii) determine whether the addition of the data packets results in the number of data packets stored in the data queues of the allocated queueing group exceeds a local threshold limit. However, if the addition of the data packet results in the number of data packets stored not exceeding the local threshold limit then allocate the data packet to a data queue in the allocated queueing group based on the predetermined factor. The data packets stored in each data queue of a queueing group thereafter being processed as normal. But, if the addition of the data packet results in either the global threshold limit or (Continued)

the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded.

18 Claims, 5 Drawing Sheets

(56) References Cited

U.S. PATENT DOCUMENTS

| | | | |
|---|---|---|---|
| 6,788,697 B1* | 9/2004 | Aweya | H04L 49/9036 370/252 |
| 7,730,238 B1* | 6/2010 | Arulambalam | H04L 49/9047 710/52 |
| 7,733,894 B1* | 6/2010 | Giacobbe | H04L 47/29 711/171 |
| 2007/0230493 A1* | 10/2007 | Dravida | H04W 36/02 370/412 |
| 2012/0127860 A1 | 5/2012 | Arumilli et al. | |
| 2016/0099880 A1* | 4/2016 | Swartzentruber | H04L 49/9084 370/235 |
| 2016/0099881 A1* | 4/2016 | Swartzentruber | H04L 49/9084 370/235 |
| 2016/0337142 A1* | 11/2016 | Attar | H04L 49/901 |

* cited by examiner

METHOD OF REDUCING LATENCY IN COMMUNICATION OF DATA PACKETS

FIELD OF THE INVENTION

The invention relates to a method of reducing latency in communication of data packets. The invention is particularly suited to use in reducing latency in communication of data packets between a wireless access point and a wireless device seeking to communicate using either the IEEE 811.b, 811.g or 811.n communication protocol.

BACKGROUND TO THE INVENTION

The following discussion of the background to the invention is intended to facilitate an understanding of the present invention. However, it should be appreciated that the discussion is not an acknowledgment or admission that any of the material referred to was published, known or part of the common general knowledge in any jurisdiction as at the priority date of the application.

Latency is described as the reaction time interval between a stimulation and a response. In computing terms, this is typically the time between the communication of a data packet and the receipt of a response to the data packet.

Latency is a fundamental issue for wireless communications. A reduction in latency times means faster communication times. However, a further advantage of reduced latency times is that there is a better optimisation of bandwidth usage as there is no need to retransmit data packets.

The problem that exists at present relates to latency in the wireless communication technology commonly referred to as "Wi-Fi". While "Wi-Fi" continues to offer the most cost effective way of using bandwidth, the general latency range of data packets communicated using this technology is between 400 to 800 m/s. This is in comparison to current mobile broadband connections which have a latency generally in the order of 50 m/s. The new 5G connection has a targeted latency of between 1 and 10 m/s.

To compensate for these higher latency rates, networking hardware looks to operate at higher and higher speeds. However, the technologies required to operate at these higher and higher speeds are expensive and potentially hazardous to general health. A further problem of seeking to compensate higher latency rates by high speed technologies is that the infrastructure for such technologies does not exist in developing or under-developed countries, leaving them to suffer the full effects of the latency problem.

Alternative methods of addressing this issue have been directed to ensuring that time spent by "Wi-Fi" hardware not transmitting a data packet to its intended destination is minimised, if not eliminated. This generally involves utilising multiple data packet queues that are processed on a weighted round robin basis.

While these alternative methods can reduce latency, it is also possible for these methods to become inundated with data packets that need to be retransmitted as they did not reach their intended destination during initial transmission. When this happens, latency times for all communications can increase as the "Wi-Fi" hardware is spending significant resources on retransmitting these data packets which should otherwise be employed in transmitting new data packets.

It is therefore an object of the present invention to provide an alternative method of reducing latency between a wireless access point and a wireless device.

SUMMARY OF THE INVENTION

Throughout this document, unless otherwise indicated to the contrary, the terms "comprising", "consisting of", and the like, are to be construed as non-exhaustive, or in other words, as meaning "including, but not limited to".

In accordance with a first aspect of the present invention there is a method of reducing in communication of data packets, the method comprising the steps of:
  receiving a data packet from a first device;
  determining whether the addition of the data packet results in the current number of data packets stored in all data queues exceeds a global threshold limit;
  if the addition of the data packet results in the number of data packets stored not exceeding the global threshold limit then
    allocating the data packet to a queueing group based on a predetermined factor;
    determining whether the addition of the data packets results in the number of data packets stored in the data queues of the allocated queueing group exceeds a local threshold limit;
    if the addition of the data packet results in the number of data packets stored not exceeding the local threshold limit then
      allocating the data packet to a data queue in the allocated queueing group based on the predetermined factor;
  processing the data packets stored in each data queue of a queuing group.
  where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded.

The method may also include the step of calculating a hash value for the data packet and where the predetermined factor is the calculated hash value. In alternative configurations, however, the predetermined factor may be one or more of the following: the time the data packet was sent; the time the data packet was received; a random value.

The method may also include the step of updating the pointer to point to the next queueing group in a predetermined sequence when the addition of the data packet results in the global threshold limit being exceeded.

Each data queue may be associated with a reference table, the reference table including details of the length of the data queue and where the length of each data queue, as included in its associated reference table, are compared to determine the longest data queue in a queueing group. In a first alternative configuration, the reference table further includes details of the size of each data packets stored in the associated data queue. In a second alternative configuration, the method may further include the step of setting a debt value to an initial value and thereafter, following sequential processing of a data packet from a data queue, decrementing the debt value by the size of the processed data packet as stored in the reference table associated with that data queue and the step of ceasing processing of the data queues when the size of the next data packet to be processed is greater than the current debt value.

A comparison between a global counter value and a predetermined global limit value may determine whether the addition of the data packet results in the current number of data packets stored in all data queues exceeds a global threshold limit. Similarly, a comparison between a local counter value and a predetermined local limit value may determine whether the addition of the data packet results in the current number of data packets stored in the data queues of the allocated queueing group exceeds a local threshold limit. Both the local threshold limit and the global threshold limit, either together or individually, may be updated either in real-time or periodically. In one preferred arrangement, the global threshold limit is six thousand.

All the data packets of a data queue may be processed before processing the data packets of any other data queue and the data queues of each queueing group are processed in accordance with a predetermined sequence. The predetermined sequence may be set in accordance with the time of establishment of each data queue.

The data queues may operate on a first-in, first-out basis. In the arrangement considered most applicable to the invention, the data packets are communicated wirelessly.

In accordance with a second aspect of the present invention, there is a communications device having a processing unit, communications system and memory, the processing unit, communications system and memory operable in combination to perform the method of reducing latency in communication of data packets according to the first aspect of the present invention.

In accordance with a third aspect of the present invention, there is a method of retrofitting a communications device to perform a method of reducing latency in communication of data packets comprising the steps of:
- deleting or disabling at least some existing code directed to reducing latency of data packets stored on the firmware of the communications device;
- transmitting to the communications device, in data form, code for performing the method of reducing latency in communication of data packets according to the first aspect of the present invention; and
- writing the transmitted code to the firmware of the communications device.

In accordance with a fourth aspect of the present invention, there is a memory storage device for retrofitting a communications device to perform a method of reducing latency in communication of data packets, the memory storage device having executable code stored thereon that, when processed by a processing unit, operates to perform the method described in the third aspect of the present invention.

BRIEF DESCRIPTION OF THE DRAWINGS

The invention will now be described, by way of example only, with reference to the accompanying drawings, in which.

PREFERRED EMBODIMENTS OF THE INVENTION

In accordance with a first embodiment of the invention there is a method 10 of reducing latency in communication of data packets between a wireless access point 12 and a wireless device 14.

Figure 1:
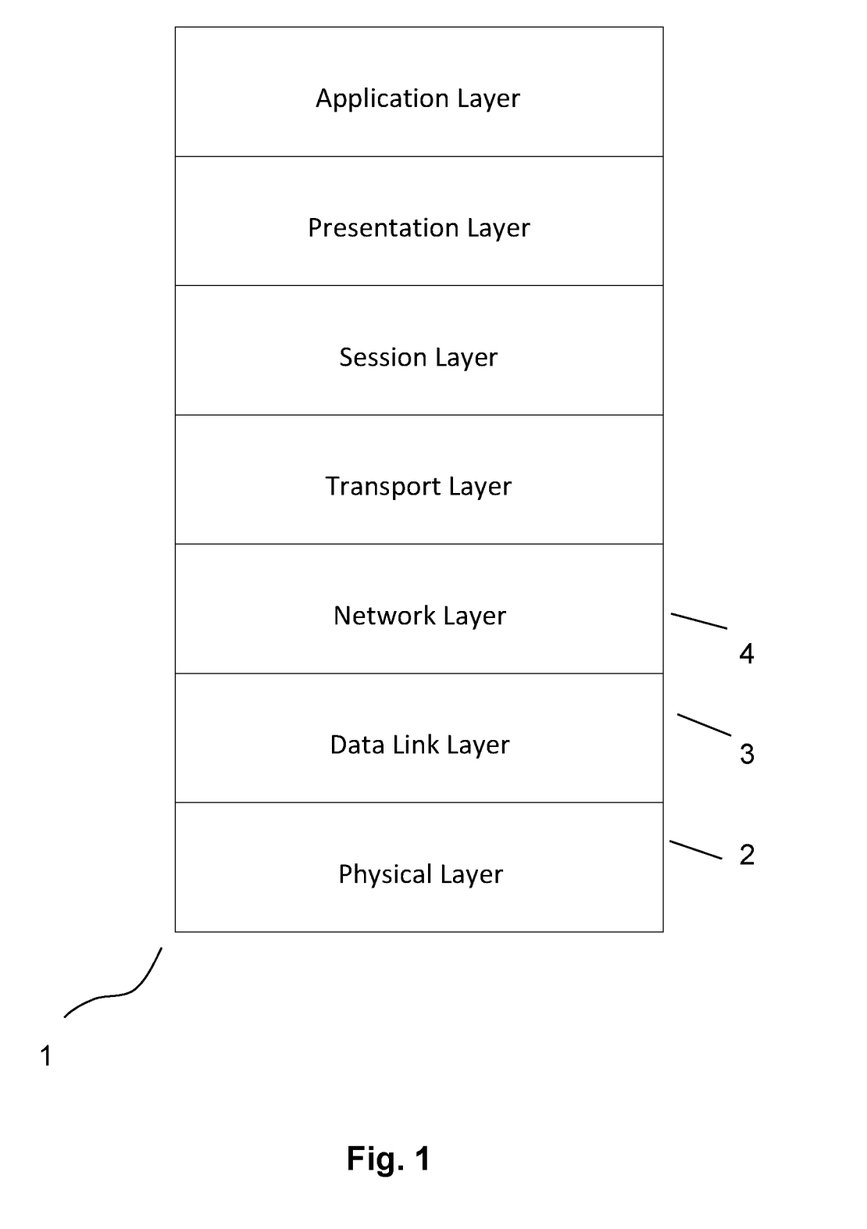
FIG. 1 is an illustration of the layers of the OSI model and their interdependence.

For the purposes of this embodiment, the wireless access point 12 is a consumer modem/router. It is to be understood that a wireless access point 12 such as contemplated by this embodiment is often referred to as a "layer 3 device". This reference is based on the fact that such a device need only comprise three (3) layers of the Open Systems Interconnection model 1 ("OSI model"), being the physical layer 2, the data link layer 3 and the network layer 4. However, the wireless access point 12 of this embodiment includes all seven layers of the OSI model as shown in FIG. 1.

Figure 2:
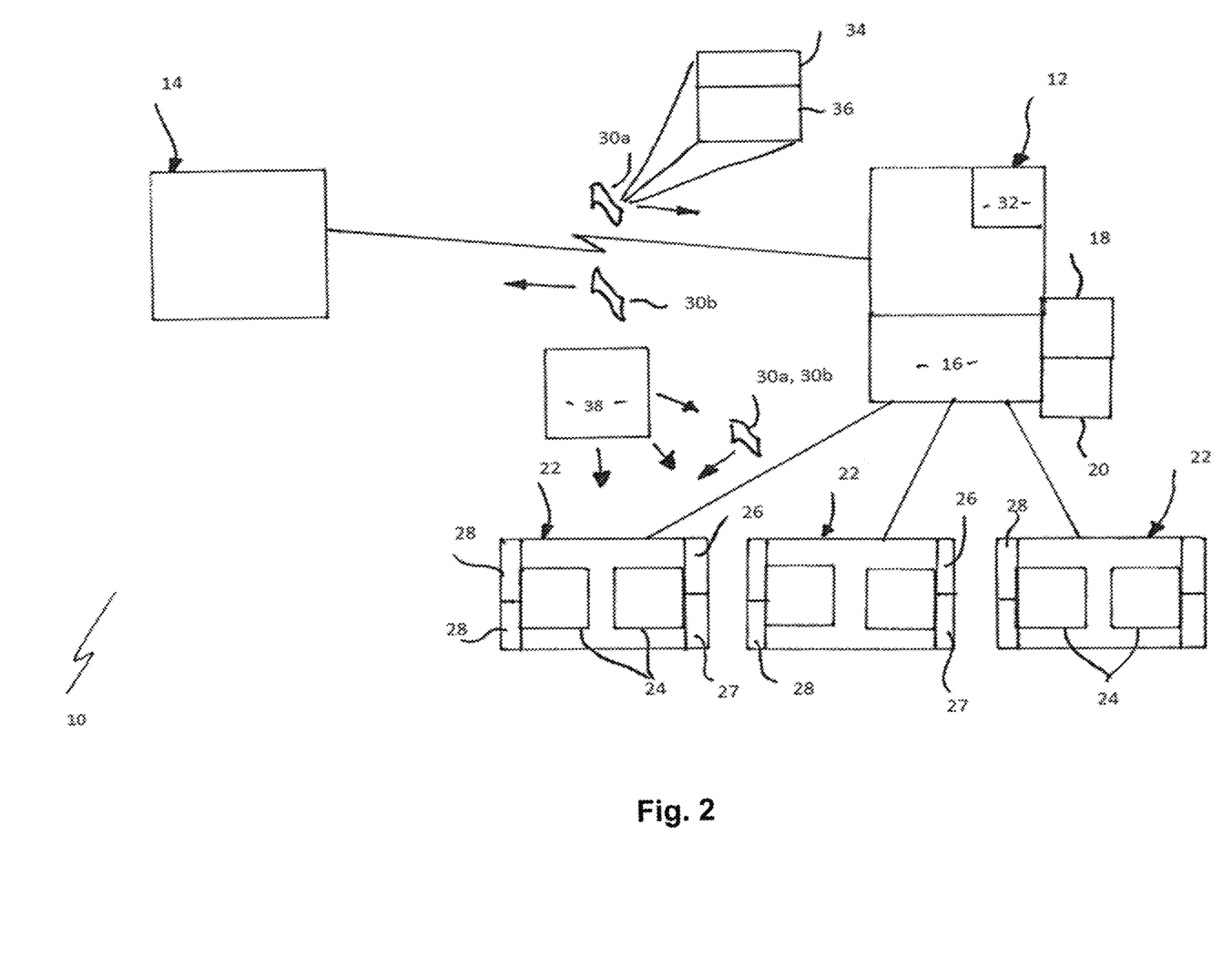
FIG. 2 is a schematic of a first embodiment of the invention.
Figure 3:
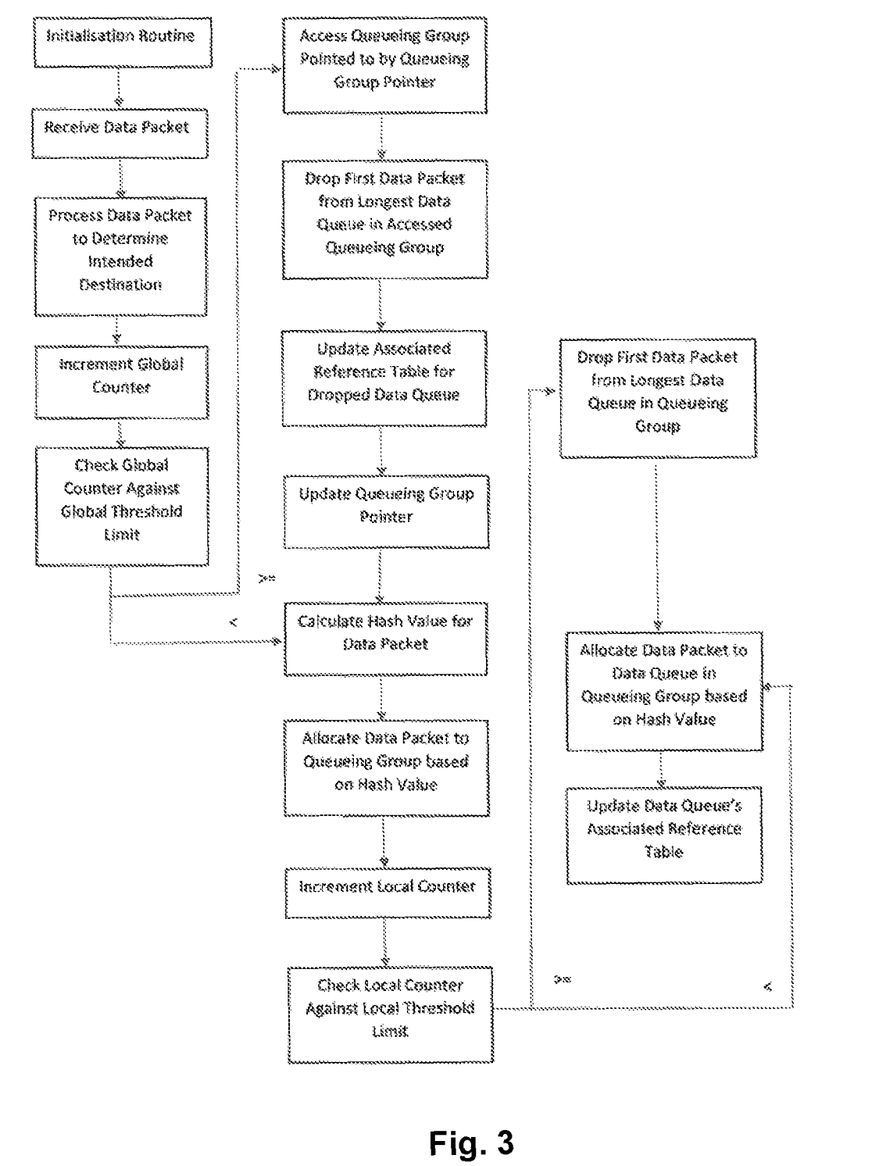
FIG. 3 is a flowchart of the steps that form the method of the first embodiment of the invention.
Figure 4:
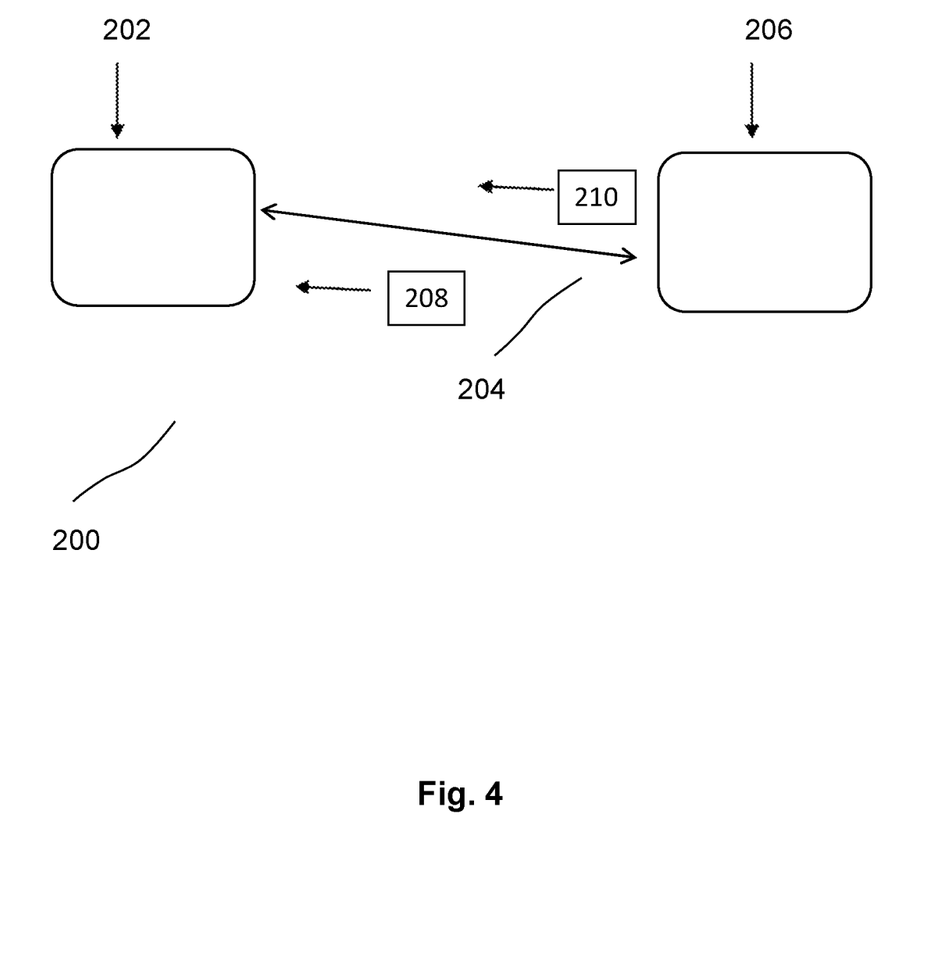
FIG. 4 is a schematic of a second embodiment of the invention.
Figure 5:
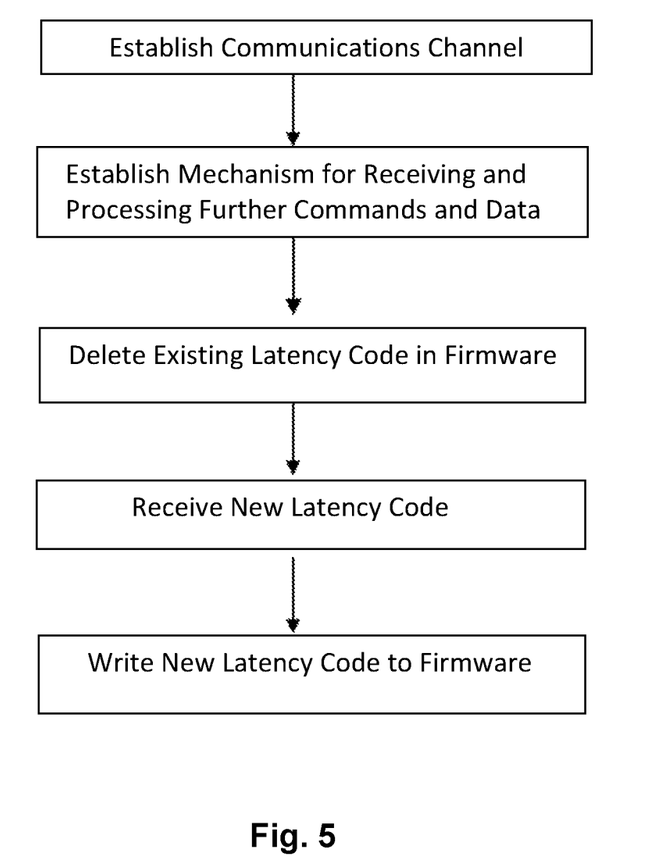
FIG. 5 is a flowchart of the steps that form the method of the second embodiment of the invention.

The wireless access point 12 also incorporates what can be best described as an additional layer 16. For the purposes of this description, this additional layer will be hereafter referred to as the queueing layer 16. A global threshold limit 18 and a global counter 20 is associated with the queuing layer 16.

Each queueing layer 16 contains a plurality of queueing groups 22. Each queuing group 22 comprises a plurality of data queues 24. A local threshold limit 26 and a local counter 27 is associated with each queueing group 22.

Each data queue 24 has an associated reference table 28. Each reference table 28 stores metadata relating to its associated data queue 24. Specifically, each reference table 28 stores the following information:
- The number of data packets 30 stored in the associated data queue 24;
- The size (in bytes) of each data packet 30 stored in the associated data queue 24; and
- The time at which the associated data queue 24 was initialised.

The actual configuration and specification of the wireless device 14 is immaterial to the present invention. The wireless access point 12 and the wireless device 14 seek to communicate with each other using a wireless communication protocol as would be well known to the person skilled in the art.

The method 10 is best described in the context of two examples of its intended use as set out hereafter.

Example 1—Inbound Data Packets

The wireless access point 12 commences an initialisation routine. The initialisation routine results in the establishment of each queuing group 22, and by extension their related data queues 24. Importantly, however, the initialisation routine also establishes a sequence for the queueing groups 22 as will be described in more detail hereafter.

As part of the establishment of the data queues 24, a reference table 28 for each data queue 24 is also established. Establishing the reference table 28 involves setting the number of data packets 30 and size of each data packet 30 to a null value. At the same time, the queueing layer 16 determines the time at which the associated data queue 24 was initialised by referencing the current time value as identified by a real time clock 32 forming part of the wireless access point 12 (i.e. a timestamp value). This timestamp value is recorded in the reference table 28 as the time at which the associated data queue 24 was initialised.

The recorded time of establishment of each data queue 24, as recorded by their associated reference tables 28, operates to also establish a sequence for the data queues 24 as will be described in more detail hereafter.

Following completion of the initialisation routine, the wireless device 14 sends an initial data packet 30 to the wireless access point 12. On receipt the initial data packet 30 is analysed by the wireless access point 12 at the physical layer 2 which operates as normal to convert the data packet 30 from its radio signal form into an electronic form that can be used internally by the wireless access point 12. For the purposes of this example, this data packet 30 as received by the wireless access point 12 will be referred to hereafter as an inbound data packet 30a.

The inbound data packet 30a is then passed from the physical layer 2 to the network layer 4, bypassing the data link layer 3.

The network layer 4 first processes the inbound data packet 30a to differentiate packet header data 34 from packet body data 36. The network layer 4 then assesses the packet header data 34 to determine the intended destination of the inbound data packet 30a. For the purposes of this example, the wireless access point 12 is the intended destination.

As the wireless access point 12 is the intended destination for the inbound data packet 30a, the network layer 4 operates to calculate a hash value for the inbound data packet 30a. The calculated hash value is then passed to the queueing layer 16 which uses this value to determine which queueing group 22 the inbound data packet 30a is to be allocated too.

Before allocating the data packet 30a to a queueing group 22, the queueing layer 16 increments the value of the global counter 20. The global counter 20 value is thereafter assessed against a global threshold limit 18 value.

If the global counter 20 is less than the global threshold limit 18, the queueing layer 16 proceeds to formally allocate the inbound data packet 30a to its intended queueing group 22. However, if the global counter 20 is greater than or equal to the global threshold limit 18 value, the queueing layer 16 operates as follows.

The queueing layer 16 accesses a queuing group pointer 38 to identify the relevant queuing group 22 for immediate processing. Once identified, the queueing layer 16 accesses the reference tables 28 associated with each data queue 24 in that queueing group 22 to determine the longest data queue 24. The queueing layer 16 then operates to drop the first inbound data packet 30a from this data queue 24 (i.e. the longest data queue 24 in the queueing group 22).

In this manner, each data queue 24 operates on a first-in, first-out (FIFO) basis for inbound data packets 30a.

The queueing layer 16 then operates to check the inbound data packet's 30a calculated hash value to determine which of queueing groups 22 the inbound data packet 30a should be added to. The queueing layer 16 then operates to formally allocate the inbound data packet 30a to that queueing group 22 and update the reference table 28 associated with the data queue 24 from which the first inbound data packet 30a has been dropped (i.e. by decrementing the value representing the number of data packets 30 stored in that data queue 24 and removing that first inbound data packet's 30 associated size record).

Following dropping of this inbound data packet 30a, the queueing layer 16 operates to change the value of the queueing group pointer 38 to point to the next queueing group 22 in the queueing group sequence established during the initialisation routine.

Once the inbound data packet 30a has been allocated to a queueing group 22, the queueing layer 16 again references the inbound data packet's 30a calculated hash value to determine which of the data queues 24 in this queueing group 22 the inbound data packet 30a should be added too.

Before adding the inbound data packet 30a to its intended data queue 24, the queueing layer 16 increments the value of the local counter 27 associated with the queuing group 22 that the inbound data packet 30a has been allocated too. The local counter 27 value is thereafter assessed against a local threshold limit 26 value.

If the local counter 27 value is less than the local threshold limit 26 value, the queueing layer 16 simply operates to allocate the inbound data packet 30a to a data queue 24 based on its calculated hash value. However, if the local counter 27 value is greater than or equal to the local threshold limit 26 value, the queueing layer 16 operates to drop the first inbound data packet 30a presently in the data queue 24 having the largest number of data packets 30 (i.e. the longest data queue 24 in the queueing group 22). The queueing layer 16 then allocates the inbound data packet 30a to a data queue 24 based on its calculated hash value.

Following the adding of the inbound data packet 30a to a data queue 24, the queueing layer 16 updates the reference table 28 associated with that data queue 24. This update involves incrementing the value representing the number of data packets 30 stored in that data queue 24 and adding a new record to the reference table recording the size (in bytes) of the added inbound data packet 30a.

Simultaneous to its handling of new data packets 30, the network layer 4 operates to process the data packets 30 stored in the various data queues 24. Data queues 24 are processed according to their queueing group 22. Furthermore, the sequence of processing of the queueing groups 22 follows the queueing group 22 sequence established during the initialisation routine.

The processing of a queueing group 22 involves the network layer 4 operating to identify the sequencing order for each data queue 24 in the queueing group 22. As indicated previously, this sequencing order is determined with reference to the time at which each data queue 24 was established during the initialisation routine. In this example, the sequencing order commences with the data queue 24 that was earliest established and finishes with the data queue 24 that was last established (according to their timestamps).

Having established the processing sequence for the data queues 24, the network layer 4 ensures that the queueing layer 16 operates to process each data queue 24 in accordance with this sequence. Processing of each data queue 24 is undertaken on a first-in first-out arrangement as would be readily known to the person skilled in the art. In this manner, the queueing layer 16 processes each inbound data packet 30a stored in these data queues 24 and passes them to the OS layer for further processing as appropriate.

Example 2—Outbound Data Packets

Before processing of an outbound data packet 30b by the wireless access point 12 can occur it is to be noted that the outbound data packets 30b are allocated to data queues 24 using the same process as described above for inbound data packets 30a. The end result is that there is a plurality of queueing groups 22, each having data queues 24 in which the outbound data packets 30b are stored.

Processing of the queuing group 22 involves the queueing layer 16 operating to identify the sequencing order for each data queue 24 in the queuing group 22. As indicated previously, this sequencing order is determined with reference to the time at which each data queue 24 was established during the initialisation routine. Once established, the queueing layer 16 accesses the reference table 28 associated with the first data queue 24 to be processed. Specifically, access is sought to the size (in bytes) of each outbound data packet 30b stored therein.

At the same time, the queueing layer 16 sets a debt value 40 to its initial value. Ideally, this initial value should be smaller than the size (in bytes) that the wireless access device 12 can transmit within a session (i.e. the wifi transmission size).

The network layer 4 processes the outbound data packets 30b on a first-in first-out arrangement. Before formally processing an outbound data packet 30b, a check is made between the current debt value 40 and the size of the outbound data packet 30b as recorded in the reference table 28. If the current debt value 40 is equal to or greater than the recorded size of the outbound data packet 30b, the network layer 4 commences formal processing of the outbound data packet 30b, by passing it to the physical layer 2 for transmission to the connected wireless device 14 identified as its intended destination.

Irrespective of whether this transmission is successful, the network layer operates to set a new value for the debt value 40. The new value is calculated as the previous debt value 40 minus the recorded size of the outbound data packet 30b just processed.

The process as described in the previous two paragraphs then repeats by processing either the next outbound data packet 30b in the same data queue 24 or moving on to the first outbound data packet 30b in the next data queue 24 in the identified sequence as appropriate. This continues until such time as either:
 (a) there are no more outbound data packets 30b to process; or
 (b) the current debt value 40 is less than the size of the current outbound data packet 30b being processed.

When either of the above events occurs, processing of the data queues 24 in that queueing group 22 is terminated and processing of the next queueing group 22 in the identified sequence commences.

It is to be appreciated by the person skilled in the art that the invention lies in limiting the number of data packets stored in the data queues 24 for processing at both a global and a localised level. In so limiting the data packets 30 stored at these two levels, the average time between receipt to further processing of the data packets 30 is reduced.

Additionally, while the invention has been described in the context of communication between a wireless access point 12 and a wireless device 14, the invention is not to be construed as limited to a wireless implementation or to implementations involving a wireless access point 12. The invention can just as easily be implemented into a wired network between multiple devices.

The invention is also able to be modified so as to remove the need for processing of either inbound or outbound messages as required. This allows the invention to be implemented in wireless devices 14 that only need to transmit data packets to the other wireless access point 12 or wireless device 14. Similarly, the invention can be implemented in wireless devices 14 that only need receive data packets from the other wireless access point 12 or wireless device 14.

In accordance with a second embodiment of the invention, where like numerals reference like parts, there is a method 200 of retrofitting a wireless communications device to perform the method described in the first embodiment. For the purposes of describing this embodiment, the wireless communications device is a wireless access point 202.

The method involves establishing a communications channel 204 between a wireless device 206 and the wireless access point 202. Once established, the wireless device 206 commences the transmission of a series of command messages 208 and data messages 210 to the wireless access point 202.

The initial command messages 208 sent to the wireless access point 202 seek to establish a mechanism for receiving and processing further command messages 208 and data messages 210. Once established, further command messages 208 are sent that result in existing code that operates to reduce latency in the processing of data packets 30a, 30b being deleted.

A series of data messages 210 follow. In combination, the data messages 210 include the code that allows the wireless access point 202 to operate in accordance with the invention as described in the first embodiment.

Following successful transmission of the full series of data messages 210, a final command message 208 is sent. This final command message 210 causes the code—as included in the preceding series of data messages 210—to be written into the firmware of the wireless access point 202. Once written, the wireless access point 202 will process data packets 30a, 30b in accordance with the invention as described in the first embodiment.

The person skilled in the art would be aware that the specific details of this second embodiment are highly dependent on the hardware used by the wireless access point 12. As such, the above description is simply an example of how to retrofit a wireless communications device 12. Furthermore, where the hardware allows, the method of retrofitting the wireless communications device 12 may be by way of wired connections or, in a yet further alternative, by way of a USB drive (the USB drive then taking on the role of wireless device 206)

It should be appreciated by the person skilled in the art that the above invention is not limited to the embodiments described. In particular, the following modifications and improvements may be made without departing from the scope of the present invention:
 While the invention has been described in the context of its implementation within the wireless access point 12 only, the invention is not limited to such an implementation. In fact, the applicant has found that by implementing the invention in both the wireless access point 12 and the wireless device 14, even lower average latency times can be achieved.
 In situations where the invention is implemented into a wireless access point 12 or wireless device 14 that is only required to process inbound data packets 30a, the reference tables 28 associated with each data queue 24 may be modified so as to omit the need to store information relating to the size of the data packet 30a.
 The processing sequence for the data queues 24 and/or queueing groups 22 need not be determined by the time of establishment of the data queues 24/queueing groups 22. For instance, a predetermined processing sequence may be used. Alternatively, the processing sequence may be based on another factor such as the data queue 24 or queueing group 22 including the then oldest data packet 30a, 30b. This means that the processing sequence may be fluid (i.e. being modified in real-time or near real-time).
 Where the invention is implemented using a processing sequence that is not based on the time of establishment of a data queue 24, the reference tables 28 may also omit the need to store the time of establishment of the data queue 24. Additionally, in this instance, the initialisation routine may be similarly modified.

The invention can be modified so that the decision as to which data queue 24/queueing group 22 a data packet 30a, 30b is to be allocated to is based on a factor other than its hash value. For instance, data packets 30a, 30b may be allocated to data queues 24/queueing groups 22 on the basis of the time the data packet was sent or the time the data packet was received or simply at random or a combination of any of the preceding factors.

The invention may be modified such that rather than checking if a counter 20, 27 exceeds a threshold limit 18, 26, the counters 20, 27 may operate on a decremental value. In this manner, the initialised value for each counter 20, 27 is set to the threshold limits 18, 26 and action is only taken when the counter 20, 27 reaches zero. In this manner, when actions such as the addition of a data packet 30a to a data queue 24 is taken, rather than incrementing the counters 20, 27, the counters 20, 27 are decremented so as to ensure that the threshold limits 18, 26 are only exceeded when intended.

The applicant has determined that excellent performance can be achieved in situations where there are four (4) queueing groups 20 and each queueing group 20 comprises at least two data queues 22. Furthermore, based on a wireless access point 12 communicating with four (4) wireless devices 14, the applicant has determined that a global threshold limit 18 of six thousand (6,000) data packets is preferred.

In a further alternative arrangement, when processing outbound data packets 30b using the debt value 40 approach described above, once a data packet 30b has been reached having a size in excess of the then current debt value 40 processing of the data queue 24 may continue. In this manner, any later outbound data packets 30b stored in the data queue 24 having a size less than the then current debt value 40 may still be processed before processing is passed to the next queueing group 22 in the sequence.

Either, or both, of the threshold limits 18, 26 may be updated on a real-time basis or periodically. In this manner, the threshold limits 18, 26 can be adjusted in response to current average latency times of data packets. Specifically, this feature allows for the wireless access point 12 to determine whether it needs to be more aggressive in dropping data packets 30 in order to move closer to a target average latency time.

It is to be appreciated that the invention can be used in combination with any existing, or future, data communications protocol. As an example, the invention can be implemented in combination with the 802.11 set of protocols established by the Institute of Electrical and Electronic Engineers. In doing so, other elements associated with managing latency, such as dedicated retry queues and Quality of Service (QoS) arrangements. The applicant contends that such elements would be well known to the person skilled in the art and that the implementation of same within the context of the present invention would be readily apparent to them without use of any inventive faculties.

In its preferred arrangement, the wireless access point 12 operates to receive inbound data packets 30a from a single connected communications device 16 for a set period of time until moving on to receive inbound data packets 30a from the next connected communications device 16. This process continuously loops so as to allow for continuous communication across all connected communications devices 16.

In an alternative configuration, all outbound data packets 30b received from a single connected communications device 16 are preferably processed before the wireless access point 12 moves on to the next connected communications device 16. In this manner, only data packets 30a received from a single connected communications device are only ever stored in the data queues 24 at any point in time.

In a variation of the second embodiment, the method of retrofitting the communications device to perform the stated method need not delete code related to reducing latency in processing of data packets entirely. Still further, as an alternative arrangement, the existing code need not be deleted in favour of disablement.

The local threshold limit 26 need not be identical amongst queueing groups 22.

The processing order as explained in the first embodiment and the Figures is an exemplary order. In some cases, steps such as the incrementing of the counters 20, 27 may be performed in a different order to that described above.

It should be further appreciated by the person skilled in the art that the invention is not limited to the embodiments described above. Additions or modifications described, where not mutually exclusive, can be combined to form yet further embodiments that are considered to be within the scope of the present invention.

We claim:

1. A method of reducing latency in communication of data packets, the method comprising the steps of:
   receiving a data packet from a first device;
   determining whether an addition of the data packet results in the current number of data packets stored in all data queues exceeds a global threshold limit;
   if the addition of the data packet results in the number of data packets stored not exceeding the global threshold limit then
     allocating the data packet to a queueing group based on a predetermined factor;
   determining whether the addition of the data packets results in the number of data packets stored in the data queues of the allocated queueing group exceeds a local threshold limit;
   if the addition of the data packet results in the number of data packets stored not exceeding the local threshold limit then
     allocating the data packet to a data queue in the allocated queueing group based on the predetermined factor;
   processing the data packets stored in each data queue of a queuing group;
   calculating a hash value for the data packet, wherein the predetermined factor is the calculated hash value,
   where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded.

2. The method of reducing latency in communication of data packets according to claim 1, where a comparison between a global counter value and a predetermined global limit value determines whether the addition of the data packet results in the current number of data packets stored in all data queues exceeds a global threshold limit.

3. The method of reducing latency in communication of data packets according to claim 1, where a comparison between a local counter value and a predetermined local limit value determines whether the addition of the data packet results in the current number of data packets stored in the data queues of the allocated queueing group exceeds a local threshold limit.

4. The method of reducing latency in communication of data packets according to claim 3, where the predetermined sequence is in accordance with the time of establishment of each data queue.

5. The method of reducing latency in communication of data packets according to claim 1, where all the data packets of a data queue are processed before processing the data packets of any other data queue and the data queues of each queueing group are processed in accordance with a predetermined sequence.

6. The method of reducing latency in communication of data packets according to claim 1, where the local threshold limit is updated either in real-time or periodically.

7. The method of reducing latency in communication of data packets according to claim 1, where the global threshold limit is updated either in real-time or periodically.

8. The method of reducing latency in communication of data packets according to claim 1, where the predetermined factor is one or more of the following: the time the data packet was sent; the time the data packet was received; a random value.

9. The method of reducing latency in communication of data packets according to claim 1, where the data packets are communicated wirelessly.

10. A communications device having a processing unit, communications system and memory, the processing unit, communications system and memory operable in combination to perform the method of reducing latency in communication of data packets according to claim 1.

11. A method of reducing latency in communication of data packets, the method comprising the steps of:
receiving a data packet from a first device;
determining whether an addition of the data packet results in the current number of data packets stored in all data queues exceeds a global threshold limit;
if the addition of the data packet results in the number of data packets stored not exceeding the global threshold limit then
allocating the data packet to a queueing group based on a predetermined factor;
determining whether the addition of the data packets results in the number of data packets stored in the data queues of the allocated queueing group exceeds a local threshold limit;
if the addition of the data packet results in the number of data packets stored not exceeding the local threshold limit then
allocating the data packet to a data queue in the allocated queueing group based on the predetermined factor;
processing the data packets stored in each data queue of a queuing group;
where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded, and wherein the data queues operate on a first-in, first-out basis.

12. A method of reducing latency in communication of data packets, the method comprising the steps of:
receiving a data packet from a first device;
determining whether an addition of the data packet results in the current number of data packets stored in all data queues exceeds a global threshold limit;
if the addition of the data packet results in the number of data packets stored not exceeding the global threshold limit then
allocating the data packet to a queueing group based on a predetermined factor;
determining whether the addition of the data packets results in the number of data packets stored in the data queues of the allocated queueing group exceeds a local threshold limit;
if the addition of the data packet results in the number of data packets stored not exceeding the local threshold limit then
allocating the data packet to a data queue in the allocated queueing group based on the predetermined factor;
processing the data packets stored in each data queue of a queuing group;
updating the pointer to point to the next queueing group in a predetermined sequence when the addition of the data packet results in the global threshold limit being exceeded,
where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded.

13. A method of reducing latency in communication of data packets, the method comprising the steps of:
receiving a data packet from a first device;
determining whether an addition of the data packet results in the current number of data packets stored in all data queues exceeds a global threshold limit;
if the addition of the data packet results in the number of data packets stored not exceeding the global threshold limit then
allocating the data packet to a queueing group based on a predetermined factor;
determining whether the addition of the data packets results in the number of data packets stored in the data queues of the allocated queueing group exceeds a local threshold limit;
if the addition of the data packet results in the number of data packets stored not exceeding the local threshold limit then
allocating the data packet to a data queue in the allocated queueing group based on the predetermined factor;
processing the data packets stored in each data queue of a queuing group;
associating each data queue with a reference table, the reference table including details of the length of the data queue and where the length of each data queue, as included in its associated reference table, are compared to determine the longest data queue in a queueing group,
where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded.

14. The method of reducing latency in communication of data packets according to claim 13, where the reference table further includes details of the size of each data packets stored in the associated data queue.

15. The method of reducing latency in communication of data packets according to claim 14, further comprising the step of setting a debt value to an initial value and thereafter, following sequential processing of a data packet from a data queue, decrementing the debt value by the size of the processed data packet as stored in the reference table associated with that data queue and the step of ceasing processing of the data queues when the size of the next data packet to be processed is greater than the current debt value.

16. A method of reducing latency in communication of data packets, the method comprising the steps of:
receiving a data packet from a first device;
determining whether an addition of the data packet results in the current number of data packets stored in all data queues exceeds a global threshold limit;
if the addition of the data packet results in the number of data packets stored not exceeding the global threshold limit then
allocating the data packet to a queueing group based on a predetermined factor;
determining whether the addition of the data packets results in the number of data packets stored in the data queues of the allocated queueing group exceeds a local threshold limit;
if the addition of the data packet results in the number of data packets stored not exceeding the local threshold limit then
allocating the data packet to a data queue in the allocated queueing group based on the predetermined factor;
processing the data packets stored in each data queue of a queuing group;
where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded,
wherein the global threshold limited is six thousand data packets.

17. A method of retrofitting a communications device to perform a method of reducing latency in communication of data packets comprising the steps of:
deleting or disabling at least some existing code directed to reducing latency of data packets stored on the firmware of the communications device;
transmitting to the communications device, in data form, code for performing a method of reducing latency in communication of data packets, comprising the steps of:
receiving a data packet from a first device;
determining whether an addition of the data packet results in the current number of data packets stored in all data queues exceeds a global threshold limit;
if the addition of the data packet results in the number of data packets stored not exceeding the global threshold limit then
allocating the data packet to a queueing group based on a predetermined factor;
determining whether the addition of the data packets results in the number of data packets stored in the data queues of the allocated queueing group exceeds a local threshold limit;
if the addition of the data packet results in the number of data packets stored not exceeding the local threshold limit then
allocating the data packet to a data queue in the allocated queueing group based on the predetermined factor;
processing the data packets stored in each data queue of a queuing group;
where, if the addition of the data packet results in either the global threshold limit or the local threshold limit being exceeded, the first data packet from the longest data queue in an identified queueing group is dropped, the identified queueing group being a queuing group pointed to by a pointer in the case of the global threshold limit being exceeded and the identified queueing group by the allocated queueing group in the case of the local threshold limit being exceeded; and
writing the transmitted code to the firmware of the communications device.

18. A memory storage device for retrofitting a communications device to perform a method of reducing latency in communication of data packets, the memory storage device having executable code stored thereon that, when processed by a processing unit, operates to perform the method of claim 17.

* * * * *